United States Patent
Buonerba et al.

(10) Patent No.: US 8,132,686 B2
(45) Date of Patent: Mar. 13, 2012

(54) COLLAPSIBLE LIQUID TANK

(76) Inventors: Kale Mark Buonerba, Orchard Park, NY (US); David Buonerba, Orchard Park, NY (US)

( * ) Notice: Subject to any disclaimer, the term of this patent is extended or adjusted under 35 U.S.C. 154(b) by 113 days.

(21) Appl. No.: 12/483,307

(22) Filed: Jun. 12, 2009

(65) Prior Publication Data
US 2010/0314386 A1    Dec. 16, 2010

(51) Int. Cl.
*B65D 88/22* (2006.01)
(52) U.S. Cl. .................................... 220/1.6; 248/95
(58) Field of Classification Search ............. 414/542, 414/543, 467; 248/95, 97; 220/1.6, 495.06, 220/495.08, 666, 9.2; 212/179, 180
See application file for complete search history.

(56) References Cited

U.S. PATENT DOCUMENTS

| | | | | |
|---|---|---|---|---|
| 1,614,993 | A * | 1/1927 | Rothermel | 383/118 |
| 2,065,293 | A * | 12/1936 | Scudder | 220/495.11 |
| 3,674,188 | A * | 7/1972 | Anderson | 224/603 |
| 4,143,796 | A * | 3/1979 | Williamson et al. | 222/181.3 |
| 4,688,371 | A * | 8/1987 | Hecht | 53/502 |
| 5,564,599 | A | 10/1996 | Barber et al. | |
| 5,938,338 | A * | 8/1999 | McDonough | 383/24 |
| 6,015,055 | A | 1/2000 | Bonerb et al. | |
| 6,065,625 | A | 5/2000 | Bonerb et al. | |
| 6,131,756 | A | 10/2000 | Bonerb et al. | |
| 6,216,900 | B1 | 4/2001 | Bonerb et al. | |
| 6,250,488 | B1 * | 6/2001 | Narahara et al. | 220/1.6 |
| 6,299,437 | B1 | 10/2001 | Bonerb et al. | |
| 2001/0032846 | A1 | 10/2001 | Joshi et al. | |

FOREIGN PATENT DOCUMENTS
JP    2009-040448 A    5/2000

OTHER PUBLICATIONS
Patent Cooperative Treaty ISR/WO for PCT/US2010/037000, dated Jan. 17, 2011, 8 pages.

* cited by examiner

*Primary Examiner* — Stephen Castellano
(74) *Attorney, Agent, or Firm* — Stephen B. Salai, Esq.; Brian B. Shaw, Esq.; Harter Secrest & Emery LLP

(57) ABSTRACT

A collapsible liquid storage tank for use in a freight container for selectively carrying solid freight and bulk liquid freight includes a substantially rigid gantry having a plurality of support posts, a first frame, a second frame suspended from the gantry, a substantially inelastic flexible fabric container having sidewalls connected between the first frame and the second frame, a water impermeable elastic bladder disposed within the fabric container, and a hoist coupled between the gantry and the second frame for lifting the second frame towards the first frame.

11 Claims, 9 Drawing Sheets

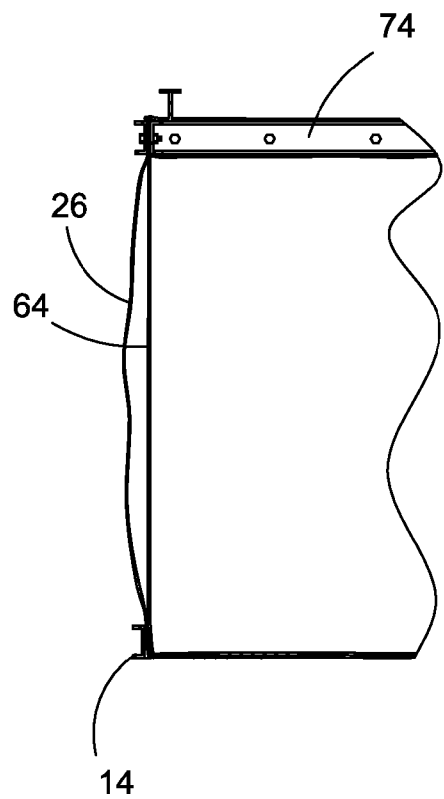 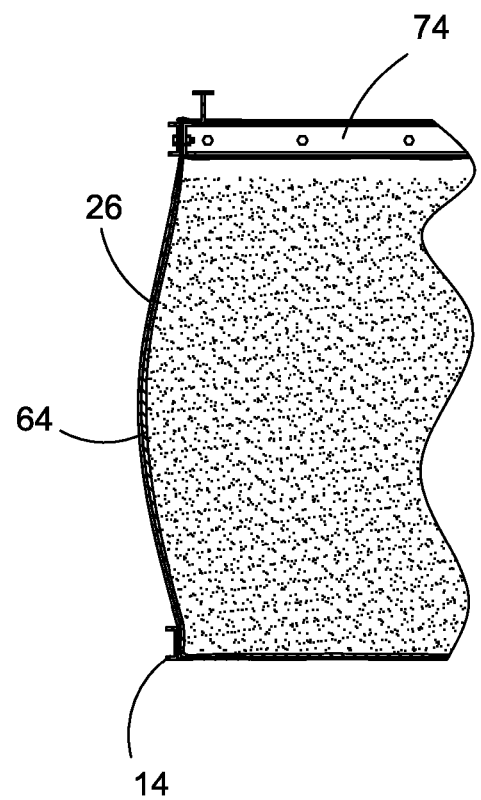
Fig. 7A  Fig. 7B
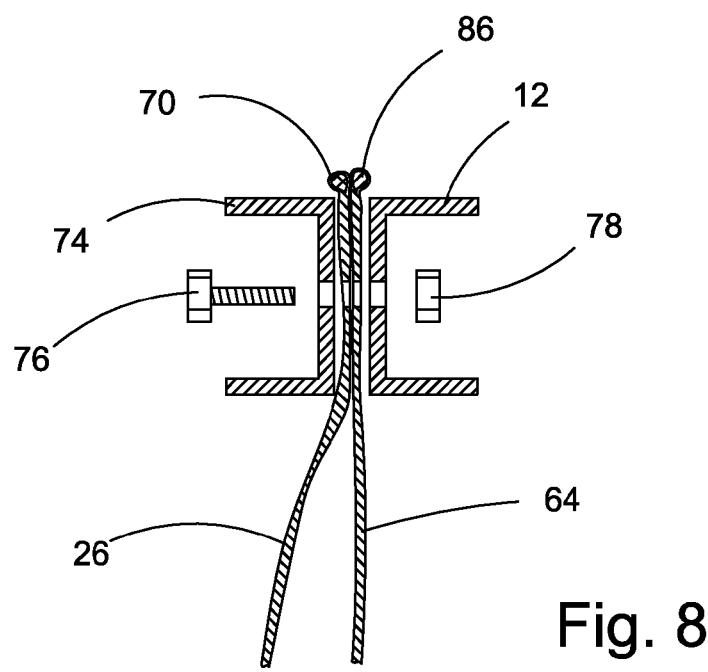
Fig. 8

COLLAPSIBLE LIQUID TANK

CROSS-REFERENCE TO RELATED APPLICATIONS

None

STATEMENT REGARDING FEDERALLY SPONSORED RESEARCH OR DEVELOPMENT

None

REFERENCE TO A "SEQUENCE LISTING"

None

BACKGROUND OF THE INVENTION

1. Technical Field

This invention relates generally to collapsible tanks for freight containers that allow the freight container to be converted to selectively carry solid freight or bulk liquid freight, and more particularly to a collapsible tank that is both stronger and easier to clean than heretofore known tanks.

2. Description of Related Art

Collapsible tanks of the general type with which this invention is concerned are shown in U.S. Pat. Nos. 6,015,055; 6,065,265; 6,131,756; 6,216,900; and 6,299,437.

SUMMARY OF THE INVENTION

While the collapsible containers described in the patents mentioned above have been very successful and have provided significant advantages over liquid transfer vessels used in the past, there is a need for such containers that are especially adapted for use in transporting liquid food products, and particularly for containers for storing and transporting food products which containers are inexpensive, light, and easy to clean. It is to these characteristics of containers for transporting liquids that the present invention is addressed.

Heretofore, such tanks have employed a flexible inner liner and a flexible outer shell attached to top and bottom frame portions of the tank.

A disadvantage of constructions of the type heretofore used is that it is desirable, for reducing the load on the outer shell and the structure supporting the tank, that the sides and perhaps the bottom of the tank be permitted to swell to a slightly rounded shape when filled with liquid, to reduce stresses on the tank material. For cleaning purposes, it is preferable that the sides and bottom of the tank be relatively flat so that they may be effectively cleaned between uses Briefly stated and in accordance with one aspect of this invention a collapsible liquid storage tank for use in a freight container for selectively carrying solid freight and bulk liquid freight includes a substantially rigid gantry having a plurality of support posts, a first frame, a second frame suspended from the gantry, a substantially inelastic flexible fabric container having sidewalls connected between the first frame and the second frame, a water impermeable elastic bladder disposed within the fabric container, and a hoist coupled between the gantry and the second frame for lifting the second frame towards the first frame.

In accordance with another aspect of the invention the collapsible liquid storage tank includes an impermeable elastic bladder that is smaller than a substantially inelastic flexible fabric container when the water impermeable elastic bladder is relaxed and larger than the substantially elastic fabric container when the water impermeable elastic bladder is expanded so that the expanded size of the bladder is limited by the substantially in the last flexible fabric container.

In accordance with another aspect of the invention the water impermeable elastic bladder has a substantially smooth inner surface when not expanded to facilitate cleaning.

BRIEF DESCRIPTION OF THE DRAWING FIGURES

FIGS. 7A and 7B are side elevations partly in section of the collapsible storage tank of this invention, shown empty and full, respectively.

FIG. 8 is an exploded fragmentary view showing the manner in which the fabric container and inner bladder are attached to the frame of the invention showing the substantially inelastic flexible fabric container and the elastic bladder in section.

DETAILED DESCRIPTION OF THE INVENTION

Figure 1:
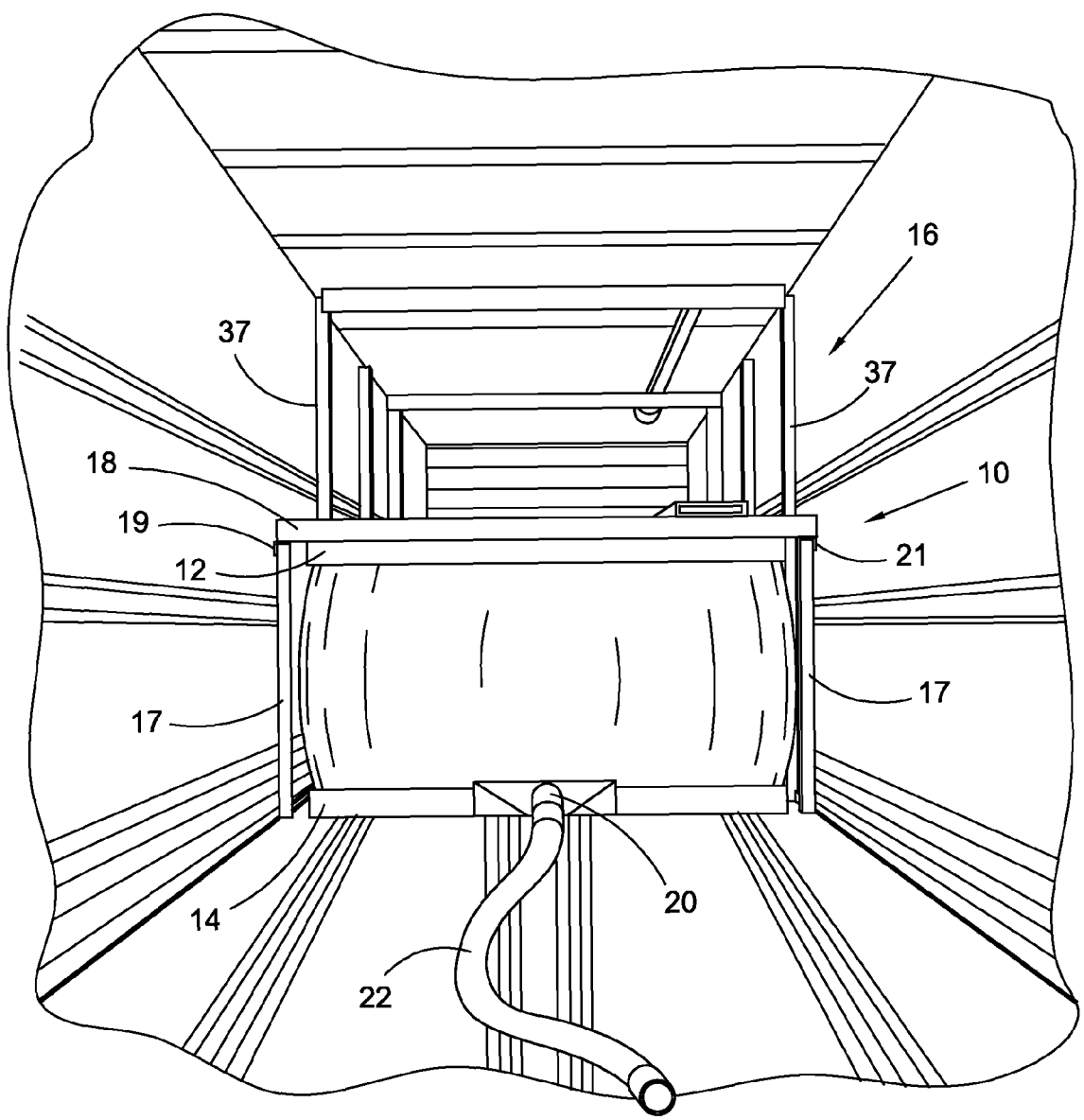
FIG. 1 is a rear elevation of a collapsible storage tank in accordance with this invention shown positioned within the body of a trailer.
Figure 10:
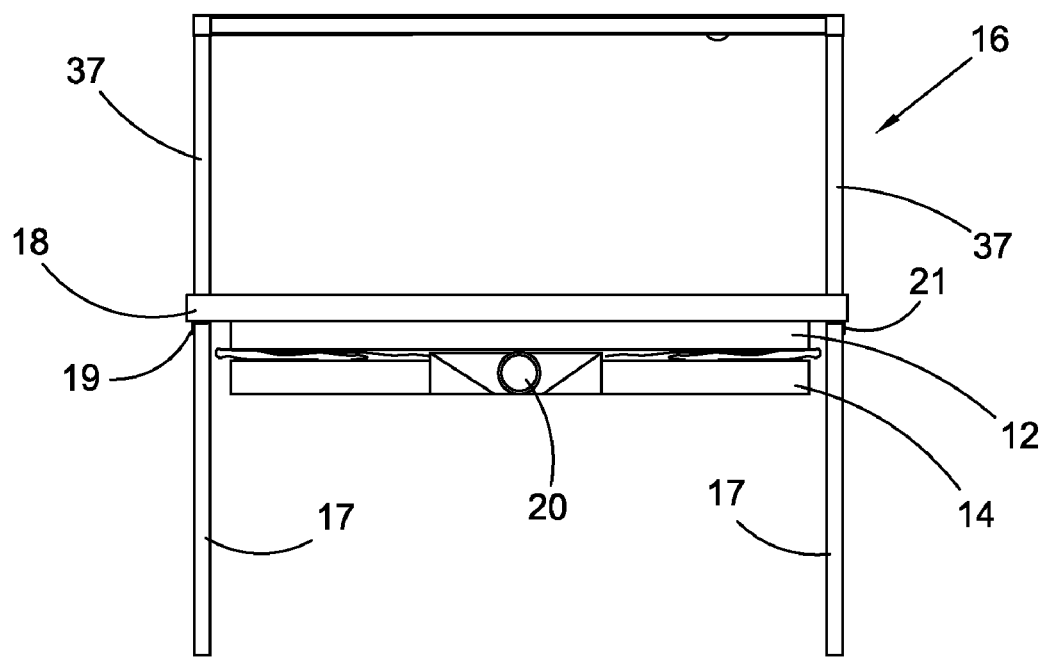
FIG. 10 is a rear elevation showing the collapsible storage tank of this invention in transition between the deployed position and the collapsed position.
Figure 11:
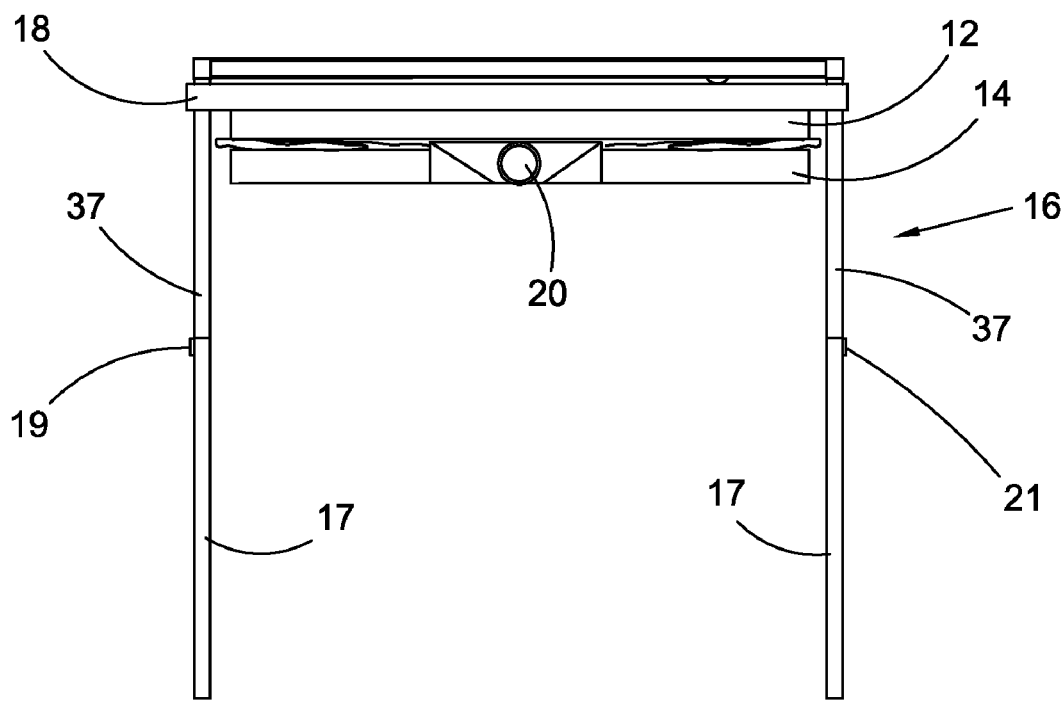
FIG. 11 is a rear elevation showing the collapsible storage tank of this invention shown in the fully collapsed storage configuration.
Figure 12:
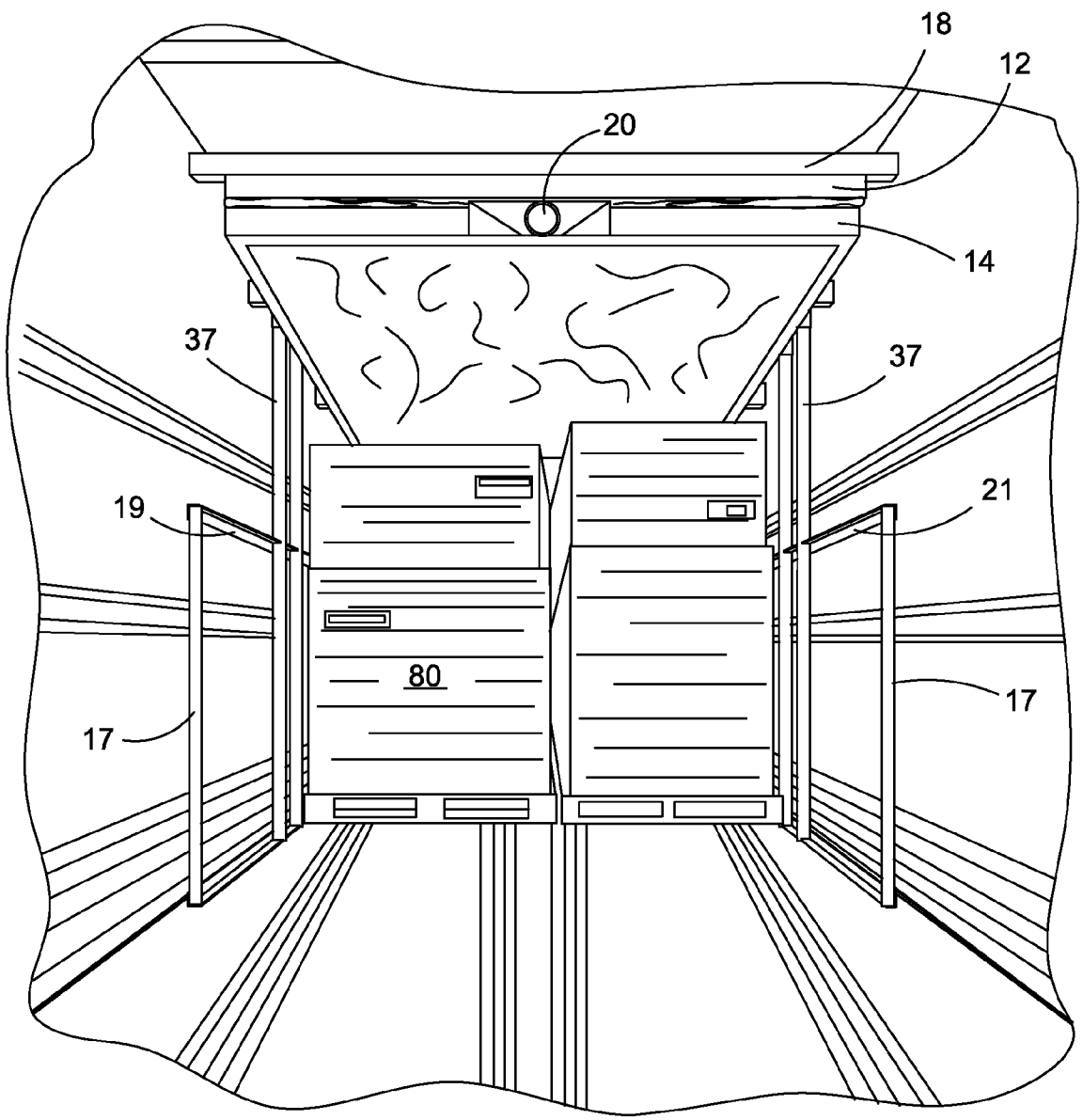
FIG. 12 is a rear view, in perspective, showing the storage tank in the stowed position with cargo positioned beneath the tank.

FIG. 1 is a rear elevation of a collapsible liquid tank 10 in accordance with this invention shown positioned within the body of a trailer used to transport the tank and other cargo. The tank 10 is attached between and supported by upper 12 and lower 14 frame members that are suspended from a gantry 16 that includes a plurality of short vertical supports 17 along each side and an upper gantry platform comprising a plurality of cross beams 18 attached to the upper frame 12. The lower frame 14 is connected to the upper portion of the gantry by cables 34 (see FIG. 2) that permit the frame members to be selectively lowered into a liquid receiving configuration as shown in FIG. 1 or raised to the upper portion of the gantry for storage as shown in FIGS. 10-12. As can also be seen more clearly in FIGS. 2, 9A and B, 11 and 12, the gantry includes intermediate left and right horizontally arranged support rails 19, 21, on which the ends of the plurality of transverse support beams 18 rest when the tank is in the deployed configuration. The liquid storage tank has an outlet port 20 that may be connected to a hose 22 for emptying the tank while it remains situated within the trailer. Optionally, a plurality of straps (not shown) can be attached between fittings on the floor of the trailer and the upper frame of the tank to retain the tank in position during transport.

Figure 2:
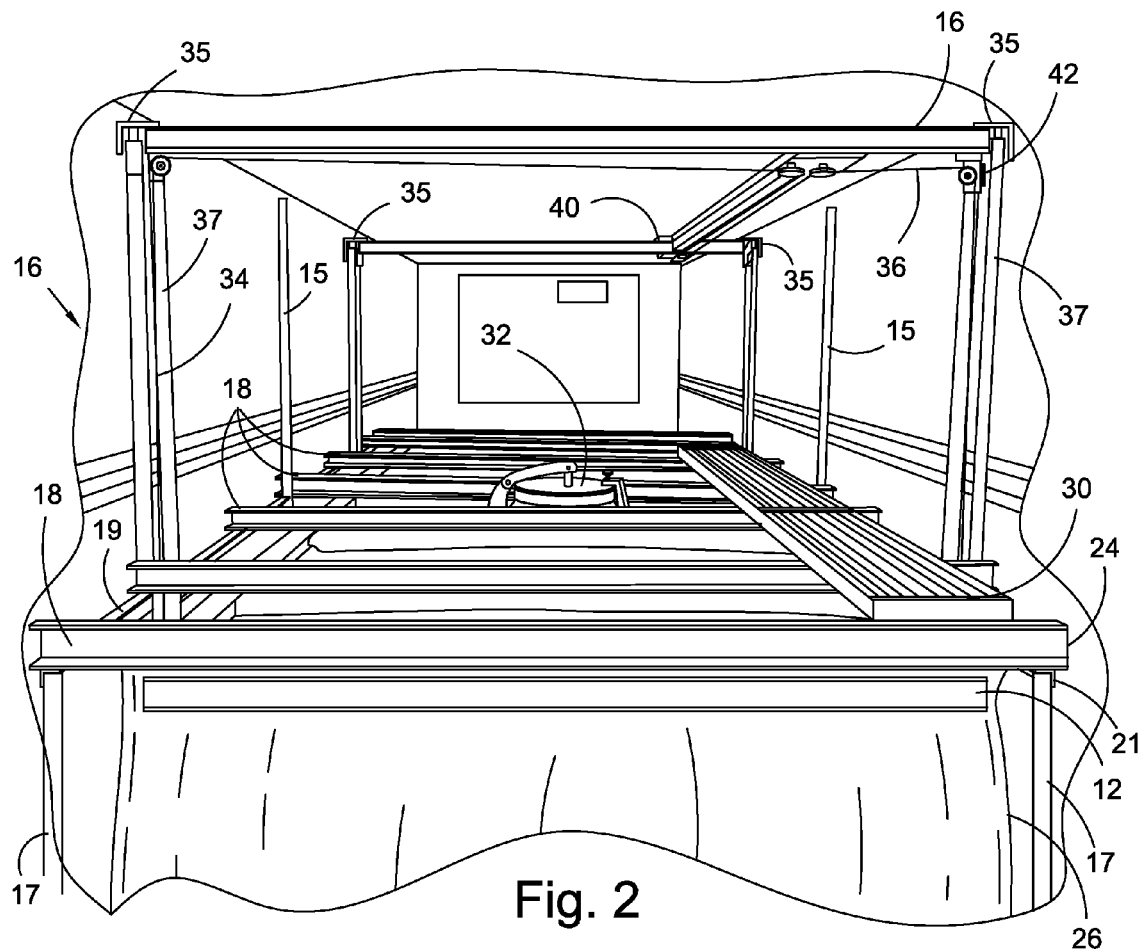
FIG. 2 is a top rear perspective view of the upper portion of the gantry and upper frame of a collapsible storage tank in accordance with this invention.

FIG. 2 shows the upper portion of the gantry 16 and the upper platform in more detail. The upper frame 12 includes a rectangular outer portion to which the tank material 26 is attached as shown in more detail below and a plurality of transverse members 18 forming the platform 18 secured to the rectangular frame 12. The transverse members 18 are spaced closely enough to permit support plates 30 to be attached thereto for permitting service persons to walk along the upper surface of the platform to access the cleaning portal 32 opening into the tank and of sufficient size to receive a cleaning person, or automatic or manual cleaning apparatus. As can be seen in FIG. 2 and also in FIGS. 9A and 9B, the ends of the transverse members 18 rest on the upper surface of the horizontal supports 19 and 21. The upper frame 12 is attached to the transverse members and is supported thereby when the tank is in the deployed position as shown in FIG. 2. The lower frame member 14 is supported by the tank material, and preferably rests on or near the floor of the trailer as shown in FIG. 1.

The gantry includes a plurality of short vertical support members 17, a long double support member 37, 43 at each corner, and a single support member 15 along each side disposed between the double support members. The double support members 37 support the pulleys 42 around which the lifting cables 34, 36 are entrained. The single support members support the horizontal support rails 19 and 21, and also act as guides for the transverse members 18, which, as can be seen in FIGS. 2 and 9, engage the vertical support members 37, 43, 15 on different sides to prevent the upper frame member 12 from swinging to and fro.

Cables 34, 36 are attached to a motorized winch 40 and entrained over pulleys 42 mounted to the upper platform of the gantry and then downwards to the lower support frame 14 for the tank.

Figure 3:
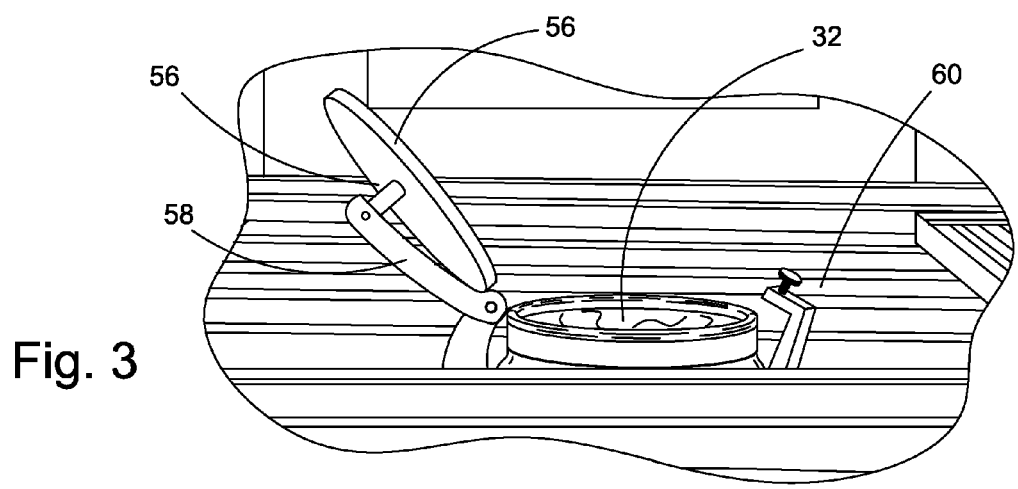
FIG. 3 is an enlarged perspective view of a cleaning portal of a collapsible storage tank in accordance with this invention.

FIG. 3 is an enlarged view of the cleaning portal 32 showing a cover 56 mounted to a pivot arm 58 swung out of position to permit a cleaning hose to be inserted into the portal 32. A latch 60 or a plurality of latches positioned around the periphery of the cleaning portal secure the cover in a closed position for transport. Preferably, the portal 32 is sufficiently large to allow a person to enter, or to allow a cleaning apparatus to be inserted into the tank.

Figure 4:
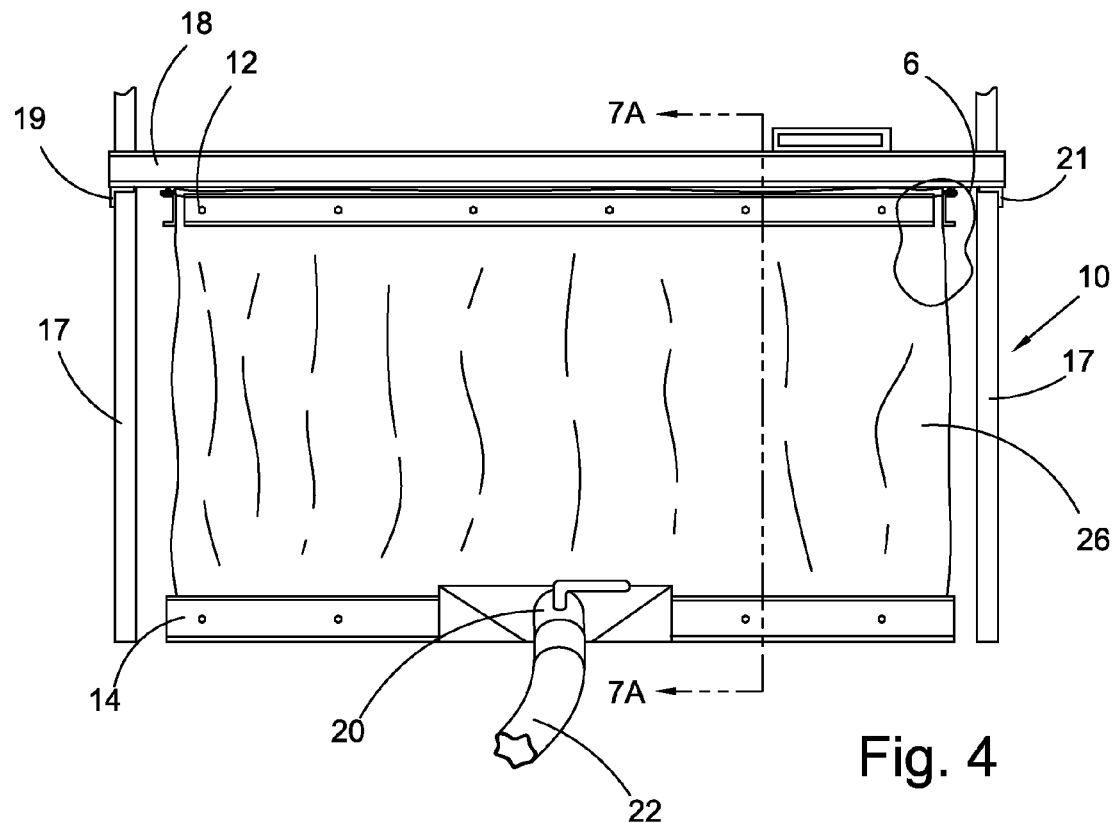
FIG. 4 is a rear elevation of an empty tank in accordance with this invention.

FIG. 4 shows the tank of this invention in an empty state in which the outer container is not expanded. Note that although the outer container is not expanded, the liquid impermeable elastic bladder 64, not visible in this view, but visible in FIG. 7A, is relatively smooth on the inside surface, thus facilitating cleaning of the tank.

Figure 5:
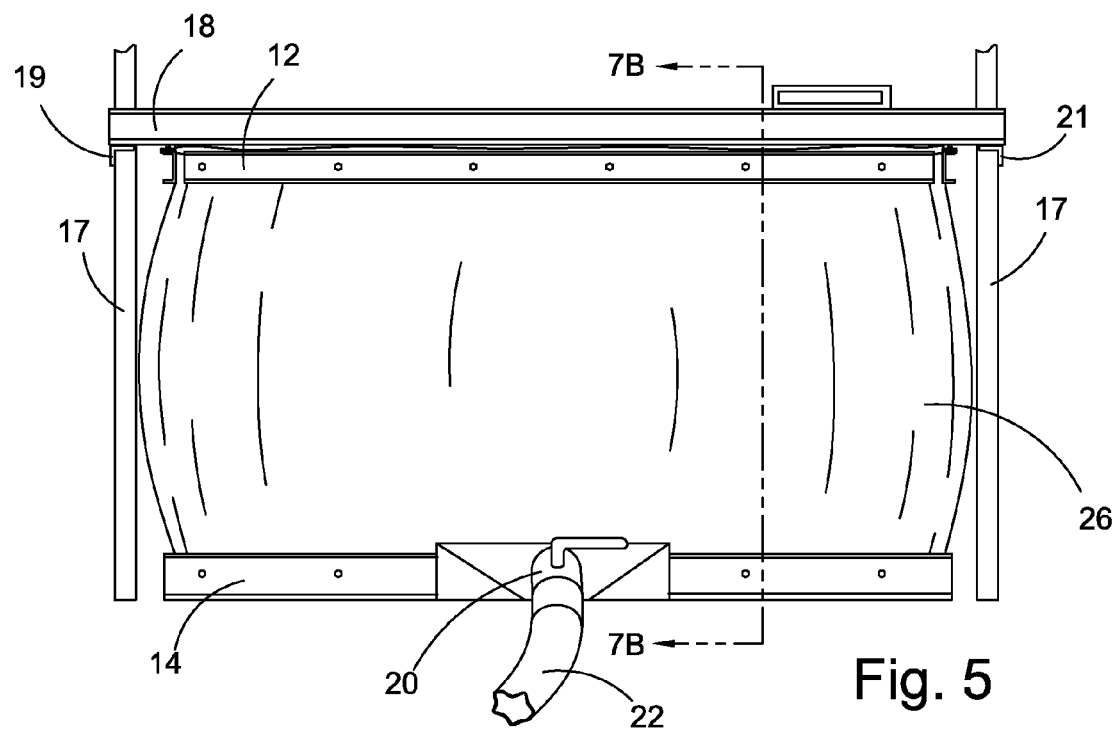
FIG. 5 is a rear elevation of a collapsible storage tank shown filled with liquid in accordance with this invention.

FIG. 5 is a side elevation similar to FIG. 1 showing the tank in the full condition. The tank 10 includes a substantially inelastic flexible fabric outer container 26 and a liquid impermeable elastic bladder 64 not visible in FIG. 4 or FIG. 5. By providing an outer container 26 that is shaped to allow a slight bulging when filled, the stresses on the outer container are substantially reduced from the stresses that would be present in a rigid container or a container not allowing a slight bulge.

Figure 6:
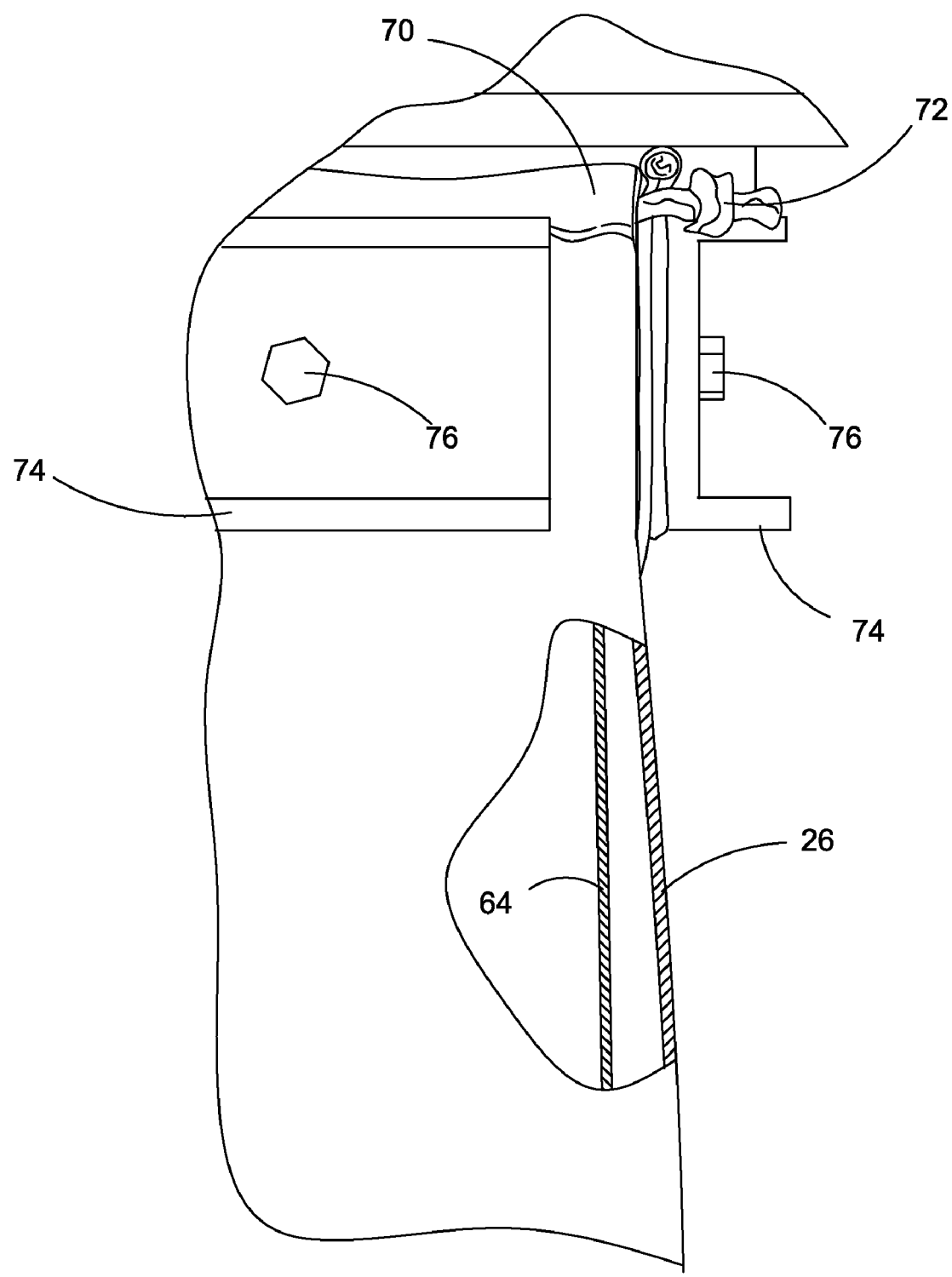
FIG. 6 is a detailed view of the upper attachment portion of the tank in accordance with this invention.

FIG. 6 shows a corner of the upper frame 12 illustrating the manner in which the inner and outer tank materials 64, 26 are connected to the frame. The fabric container 26 and the elastic bladder 64 obscure the upper frame 12 in FIG. 6. The fabric container 26 is preferably provided with a folded over sealed edge 70 forming a compartment through which a rope 72 in the nature of a drawstring or cord or the like is passed to make the upper edge of the fabric container slightly thicker than the fabric itself to prevent it from slipping. The container 26 and the inner bladder 64 are secured to the upper frame 12 by elongated U-shaped battens 74 preferably metal, or a similar structure through which bolts 76 or other fasteners are passed as more clearly shown in the detailed view of FIG. 8.

FIGS. 7A and 7B are partially exploded partially sectioned end views of a collapsible liquid storage tank 10 in accordance with this invention. FIG. 7A shows battens 74 attached to the upper tank support frame 12 and the lower frame 14, and a sectioned view of the inelastic flexible fabric container 26 and the liquid impermeable elastic bladder 64.

As can be seen from FIG. 7A, the substantially inelastic flexible fabric container 26, which is preferably made from Kevlar or a similar inelastic material, has a longer peripheral section than the unexpanded water impermeable elastic bladder 64. In this way, the elastic bladder 64 can be readily cleaned when the tank is empty as shown in FIG. 7B. Preferably, but not necessarily, the elastic bladder 64 is at least slightly stretched when the tank is empty so that it presents a smooth surface for cleaning. When the tank is filled, the elastic bladder 64 (but not the substantially inelastic flexible fabric container 26) stretches. The extent of stretching of the elastic bladder 64 is limited by the inelastic flexible fabric container 26. It is not necessary to provide reinforcing materials in the elastic bladder. The inelastic fabric container limits the amount of expansion. This allows a relatively less expensive unreinforced bladder to be employed than has been possible heretofore. Allowing the bladder to stretch to the bowed shape of the inelastic fabric container shown in FIG. 13 reduces the stresses on the fabric container and the bladder, thereby allowing the support frame to be made lighter so as to increase the useful load that can be carried by the tank.

Preferably, the inelastic fabric container 26 and the elastic bladder 64 are secured to the upper and lower frames by a securing rail or batten 74 attached to the frame by a bolt or similar fastener as shown in FIG. 8. The upper attachment is shown exploded for clarity.

FIG. 8 is an exploded view of the upper attachment portion showing the portion of the frame, the U-shaped attachment plate or batten, the bolt 76 and nut 78 in more detail. The inelastic flexible fabric container upper edge portion is preferably provided with an enlarged bead 70 to prevent the fabric layer from slipping out of the clamp. The elastic bladder 64 is preferably provided with a similar bead 86. As shown in FIG. 8, the bolt extends through the batten 74, the fabric container 26, the bladder 64, and the upper frame. As can be seen, both the fabric container and the elastic bladder are held in position by the pressure between the frame element and the batten, as well as by the enlarged edges 70, 86 that prevent the fabric and the bladder from slipping through the space between the frame and the batten. The elastic bladder 64 also preferably has a top portion welded to the side portion to provide substantially complete containment of the fluid contents.

As shown in FIGS. 9-11, the cables 34, 36 extend from winch 40 around the pulleys 42 attached to top caps 35 bridging the dual gantry end supports 43 to attachment points 44 on the lower frame 14. When the cables 34, 36 are retracted to put the tank in the storage position, the lower frame 14 is raised from a position on the floor of the trailer to a position adjacent the top of the gantry 16. The upper frame 12 and transverse members 18, which are preferably not attached to the cables, are raised with the lower frame 14 when the lower frame is lifted.

The ends of transverse members 18 engage the vertical support portions 37, 43, 15 of the gantry 16 to keep the upper frame 12 at least loosely aligned with the gantry. Left and right horizontal support rails 19, 21 support the transverse cross members 18 from which the upper frame 12 is suspended at a position intermediate the top of the gantry 16 and the bottom of the trailer. The rails are attached to the approximate midpoint of the vertical support members of the gantry 16 or alternatively, cables may be attached to the upper frame 12 that permit the upper frame 12 to be lowered into a position only part-way down the gantry structure.

Figure 9A:
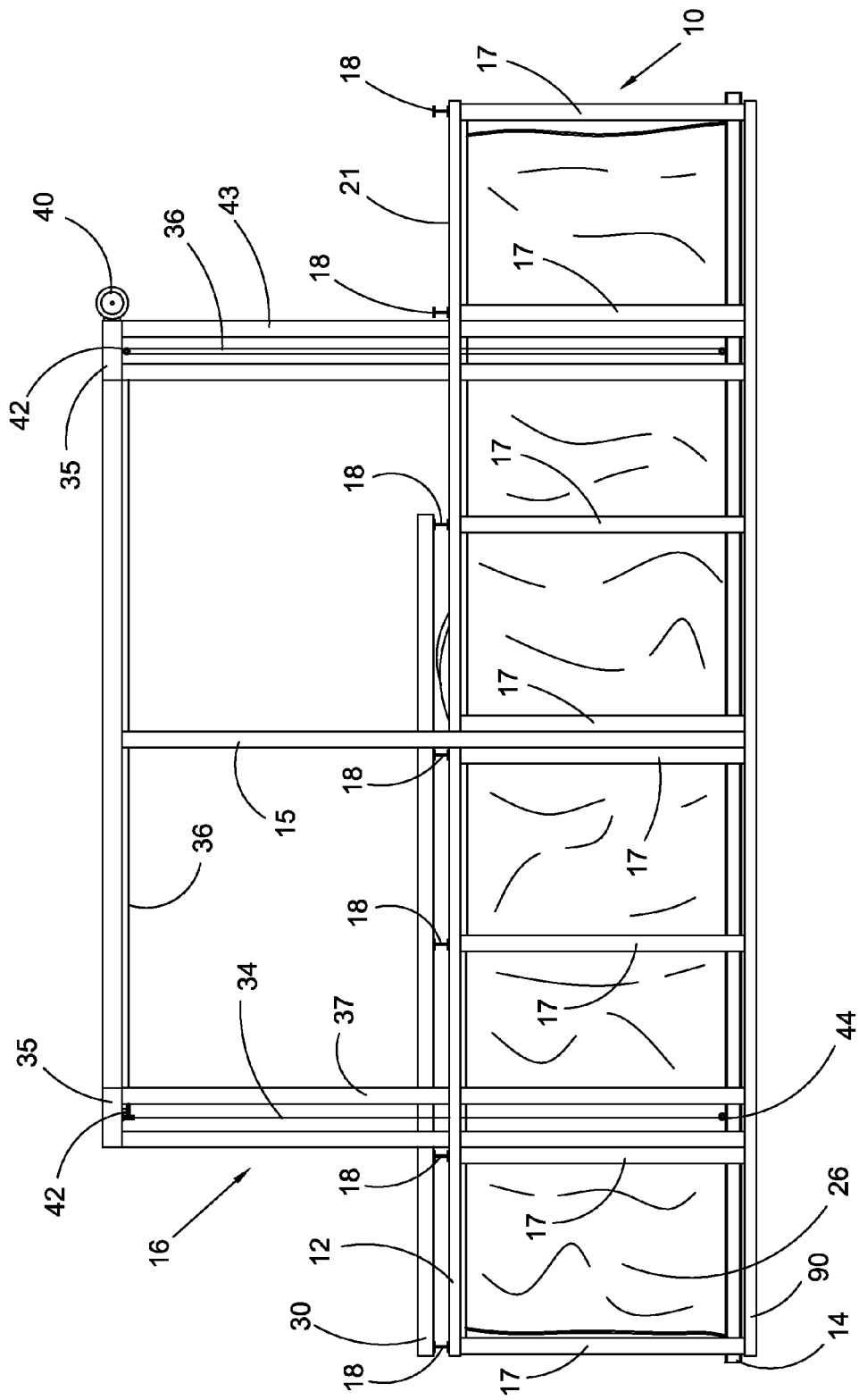
FIG. 9A is a side elevation showing the lifting mechanism for the collapsible storage tank of this invention.
Figure 9B:
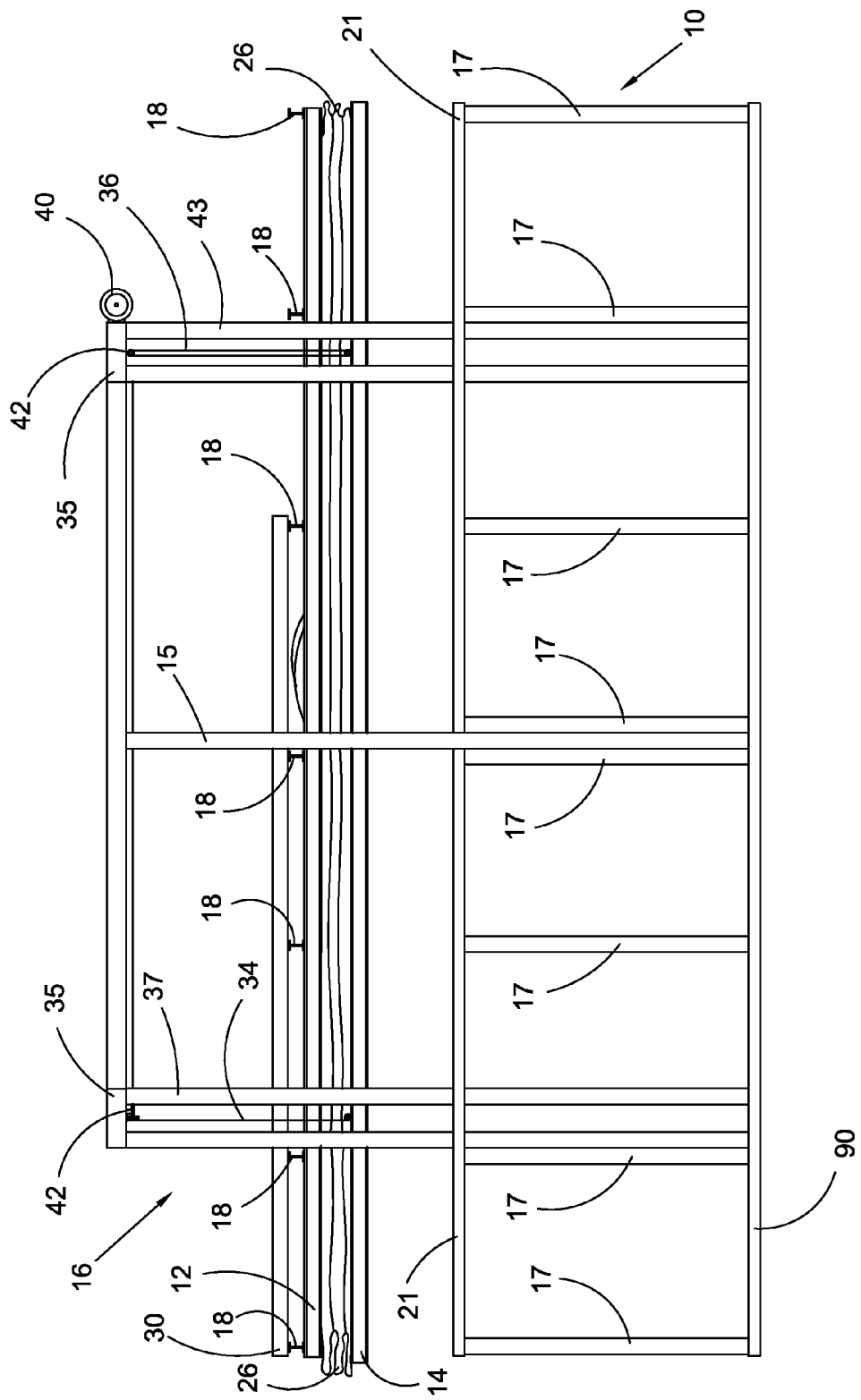
FIG. 9B is a side elevation showing the collapsible storage tank of this invention in transition from its deployed configuration to a stowed configuration.

FIGS. 9A and 9B are side elevations of the storage tank of this invention shown in its lowered position, but not filled with liquid. The gantry, vertical supports, and lifting arrangement can be seen in this figure. The cables are entrained around pulleys and attached to an upper portion of the lower frame member 14 for raising the frame member to move the tank from the deployed condition to the stowed condition as shown and described below in connection with FIGS. 10 and 11.

FIG. 9A shows the liquid storage tank of this invention and a deployed configuration. The cables 34 extending over pulleys 42 from winch 40 are fully extended so that the lower frame member 14 essentially rests on the floor of the trailer or at least proximate thereto. The upper frame member 12 is supported by cross members 18, the ends of which rest on side rails 19 and 21. The walkway 30 is supported on the upper surfaces of the cross members 18. The gantry structure can be easily visualized from this view. The dual vertical supports 37 and 43 extend from the floor of the trailer to top caps 35. Supports 37 and 43, as well as the supports on the other side of the structure, not visible in FIGS. 9A and 9B, are preferably strong enough to support the full weight of the empty tank when it is raised from the deployed configuration to the stored configuration. Aluminum or steel tubes, round or other configuration, may be used.

A plurality of shorter vertical supports 17 extend from a bottom rail 90 mounted or resting on the floor of the trailer to intermediate horizontal support rails 19 and 21. Note that the intermediate rails 19 and 21 may be formed in one or more pieces that are attached to the tops of the vertical supports and/or interrupted and welded thereto.

As can be seen from FIGS. 9A and 9B, the transverse members 18 are spaced such that different members are disposed on different sides of the vertical gantry members 37, 15, 43. This arrangement substantially prevents the tank frame from swinging longitudinally, that is in the left-right direction as seen in FIGS. 9A and 9B, as the tank is raised and lowered. Side to side movement, as shown for example in FIGS. 4 and 5, is largely restricted by the side frames.

As can be seen in FIG. 9B, when the tank is lifted, the cables raise bottom frame member 14, and at the same time collapse the tank 10 from the bottom up until the top frame member 12, cross members 18, and walkway 30 are all lifted as a unit to the top of the gantry.

This lifting can also be seen in FIGS. 10 and 11 where the cables cannot be seen.

FIGS. 10 and 11 show a storage tank 10 in accordance with this invention being raised from a configuration in which liquids are stored in the tank (see FIG. 9A) to a stored configuration in which cargo can be placed in the trailer beneath the collapsed tank. The tank in the liquid receiving configuration is shown in FIGS. 4, 5, and 9, for example. FIG. 10 shows an intermediate position in which the lower frame 14 has been raised by cables 34, 36 to a position where the liquid containing portion has been collapsed and the bottom frame 14 engages the upper gantry platform beams 18 from below.

As the lower frame 14 continues to be lifted upward by the cables, it carries the upper frame 12 and upper platform beams 18 with it until it reaches the storage position shown in FIG. 11.

FIG. 12 shows the tank structure raised into a storage position with the dry cargo 80 loaded onto the trailer beneath the collapsed tank. As can be seen, the upper 12 and lower tank 14 frames are drawn into position closely adjacent to each other and adjacent the upper platform beams 18 of the support gantry.

The invention claimed is:

1. A collapsible liquid storage tank for use in a freight container for selectively carrying solid freight and bulk liquid freight comprising:
   a substantially rigid gantry having a first plurality of support posts;
   a first frame;
   a second frame suspended from the gantry;
   a substantially inelastic flexible fabric container having side walls connected between the first frame and the second frame;
   a water impermeable elastic bladder disposed within the fabric container; and
   a hoist coupled between the gantry and the second frame for lifting the second frame towards the first frame and reducing the spacing between the second frame and the first frame.

2. The collapsible liquid storage tank of claim 1 in which the water impermeable elastic bladder is smaller than the substantially inelastic flexible fabric container when the water impermeable elastic bladder is relaxed and larger than the substantially inelastic flexible fabric container when the water impermeable elastic bladder is expanded so that the expanded size is limited by the substantially inelastic flexible fabric container.

3. The collapsible liquid storage tank of claim 1 in which the water impermeable elastic bladder has a substantially smooth inner surface when not expanded.

4. The collapsible liquid storage tank of claim 1 in which the water impermeable elastic bladder is connected to the first frame but not the second frame.

5. The collapsible liquid storage tank of claim 1 in which the substantially inelastic flexible fabric container is connected to the first frame and the second frame.

6. The collapsible liquid storage tank of claim 1 in which the first frame includes a plurality of laterally extending beams.

7. The collapsible liquid storage tank of claim 1 comprising an intermediate support rail supporting the first frame in a position between the top of the gantry and the second frame.

8. The collapsible liquid storage tank of claim 7 in which the intermediate support rail is attached to at least one of the plurality of support posts.

9. The collapsible liquid storage tank of claim 1 comprising a cleaning portal in the tank of sufficient size to permit a cleaning person to pass there through.

10. A collapsible liquid storage tank for use in a freight container for selectively carrying solid freight and bulk liquid freight comprising:
    a substantially rigid gantry having a first plurality of support posts;
    a first frame;
    a second frame suspended from the gantry;
    a substantially inelastic flexible fabric container connected to the first frame and the second frame and having side walls connected between the first frame and the second frame;

a water impermeable elastic bladder disposed within the fabric container and connected to the first frame but not the second frame; and a hoist coupled between the gantry and the second frame for lifting the second frame towards the first frame.

11. A collapsible liquid storage tank for use in a freight container for selectively carrying solid freight and bulk liquid freight comprising:

a substantially rigid gantry having a first plurality of support posts;

a first frame having a plurality of laterally extending beams;

a second frame suspended from the gantry;

at least one support rail supported by the support posts and supporting the laterally extending beams at an intermediate position between the second frame and the top of the gantry;

a substantially inelastic flexible fabric container connected to the first frame and the second frame and having side walls connected between the first frame and the second frame;

a water impermeable elastic bladder disposed within the fabric container and connected to the first frame but not the second frame; and a hoist coupled between the gantry and the second frame for lifting the second frame towards the first frame.

\* \* \* \* \*